United States Patent [19]
Broe

[11] 3,870,274
[45] Mar. 11, 1975

[54] MOTOR DRIVEN VALVE
[75] Inventor: Max Broe, Horsens, Denmark
[73] Assignee: Aktieselskabet Chr. Nielsens Eftf., Armaturfabrik, Horsens, Denmark
[22] Filed: June 29, 1973
[21] Appl. No.: 375,188

[30] Foreign Application Priority Data
June 30, 1972 Denmark .................... 3272/72

[52] U.S. Cl. ............................ 251/134, 251/134
[51] Int. Cl. ............................ F16k 31/04
[58] Field of Search .......... 251/133, 134, 136, 138; 310/41

[56] References Cited
UNITED STATES PATENTS
2,851,648  9/1958  Reger ............................ 251/134 X
2,928,573  3/1960  Edelstein ....................... 251/133 X
3,708,068  1/1973  Tischler ........................ 137/624.2 X

*Primary Examiner*—Arnold Rosenthal
*Attorney, Agent, or Firm*—Kenyon & Kenyon; Reilly, Carr & Chapin

[57] ABSTRACT

A valve with a motor connected to the valve body for moving the valve body between a closed and an open position wherein the feeding circuit of the motor comprises switches which disconnect the current to the motor when the valve body reaches its closed and its open positions, wherein the motor is a single-phased synchronous motor, having arbitrary directions of rotation and the movements of the valve body past the closed and the open positions are prevented by mechanical stops.

8 Claims, 8 Drawing Figures

MOTOR DRIVEN VALVE

BACKGROUND OF THE INVENTION

The present invention relates to a valve with a motor for opening and closing the valve body and wherein the electrical circuit of the motor comprises switches which disconnect the current to the motor when the valve body reaches its closed position and when the valve body reaches its open position.

For the operation of valves of this kind it is known to use reversible synchron-gear-motors, i.e., double motors wherein one of the motors is constructed for rotating anti-clockwise whereas the other motor is constructed for rotating clockwise. One of the motors is used for moving the valve body in one direction, and the other motor is used for moving the valve body in the other direction, and when the movement is to be reversed, the valve body is disengaged from one motor and is engaged with the other motor, e.g. by means of a clutch.

SUMMARY OF THE INVENTION

According to the present invention the motor is a single- phased synchronous motor, having arbitrary directions of rotation, and the movement of the valve body past the closed and the open positions are prevented by mechanical stops. By means of this construction, a very compact and cheap device is obtained becuase the double motor referred to above is avoided. A single-phased synchronous motor, having arbitrary directions of rotation will, of course, when feeding current is applied thereto, start in one or the other direction of rotation, but due to the fact that the movement of the valve body past the open and the closed positions is prevented by means of the mechanical stops, also the motor will, when staring, be prevented from moving the valve body in the wrong direction. Should the motor start in the wrong direction of rotation, it will be blocked by means of one of the stops and will all by itself change the starting direction. Should the motor start in the right direction, the valve body will immediately be moved in the right direction.

A very simple embodiment of the valve is characterized in that the switches are operated by means of an arm rigidly connected to the valve body, wherein the arm simultaneously serves to cooperate with at least one stop for limiting the movement of the valve body.

In case the valve is intended to control a radiator of a central heating plant wherein the motor is connected with the valve body via a train of gear wheels, it is preferred to use an embodiment of the invention wherein the mechanical stop, which prevents movement of the valve body past the closed position thereof, consists of a stop pin which cooperates with an abutment on the valve body and wherein the mechanical stop, which prevents movement of the valve body past the open position, is formed as an abutment on a gear wheel which drives the valve body and which cooperates with a stationary abutment in a gear box which contains the gear wheel and wherein the gear wheel supports members for controlling the switches of the motor in such a way that the mutual angular position of said members is adjustable and wherein the gear wheel is engageable with the valve member in different angular positions of the gear wheel and the valve member. By this embodiment it is possible in a simple way to pre-adjust the degree of opening of the valve as it is known per se for radiator valves in order to achieve balanced capacities.

Preferably, the valve body for the valve according to the present invention is formed as a plate, one side surface of which contacts a seating ring in such a way that the opening in the seating ring is uncovered by rotating the plate in its own plane. By this embodiment it is achieved that the degree of opening of the valve body is independent of the action of the pressure of difference upon the valve plate, and this means that approximately the same force is used for moving the valve body regardless of its position.

According to a further feature of the invention, one of the gear wheels between the motor and the valve body may be engaged with a wheel which projects partly from the gear box and which contacts an indicator disc having different marks and a stop pin for cooperation with the gear box in such a way that either one or the other of the marks is visible from the outside of the gear box. By using this arrangement, it is always possible to see whether the valve is open or closed. When the motor shifts the valve body from one position to the other, the contact between the disc and the corresponding gear wheel will drag the indicator disc in such a way that the indicator disc is rotated approximately one half revolution, viz. from a position wherein one of the marks is visible from the outside and to another position wherein the other mark is visible.

A very simple pre-adjustment of the valve may according to the present invention be achieved if one of the members for controlling the motor is arranged upon a cam ring which is supported by a gear wheel with friction and wherein the ring has a slot for engaging a locking arm provided on the gear box. By depressing the locking arm the ring may be arrested while the corresponding gear wheel is moved by means of the wheel, projecting partly from the gear box. By such an operation the angular position of the ring and the gear wheel will be adjusted and the pre-setting of the valve will be adjusted correspondingly.

DESCRIPTION OF THE PREFERRED EMBODIMENTS

Figure 2:
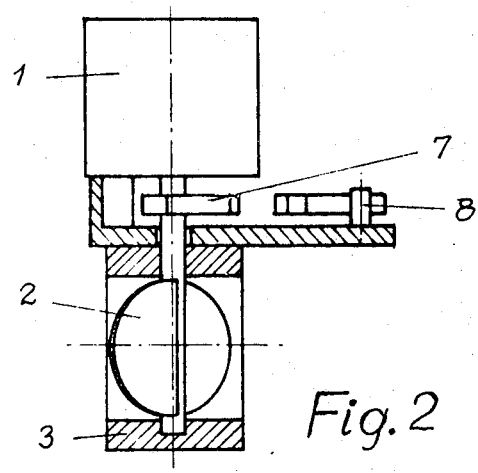
FIG. 2 shows a section along the section line II—II in FIG. 1.

On the drawing, 1 is a single-phased synchronous motor, having a symmetrical electrical field. Such motors are available on the market, however, with a built-in ratchet device which allows the rotor of the motor to rotate in one direction only. If the rotor due to the symmetrical field tries to start in the opposite direction of rotation, the ratchet device will prevent such rotation and block the rotor which will result in a reversing of the starting direction of the rotor and then the rotor will rotate in the direction which is the ratchet device.

The motor 1 is of the kind explained above, but the ratchet device has been removed and, accordingly, the motor has arbitrary directions of rotation.

The rotor of the motor is connected to a valve body 2 in a housing 3 by means of a shaft. Inside the housing two projections 4 and 10 are provided which form stops for the valve member 2 when it is rotated to closed position, i.e., anti-clockwise in FIG. 1.

In order to limit the movement of the valve body 2 in the opposite direction, opening direction, an external stop 5 is provided for cooperation with an arm 7 which extends from the shaft of the valve body. Moreover, the arm 7 cooperates with two switches 6 and 8 each of which is provided in a feeding circuit for the motor. By means of a switch 9 it is possible to switch over from one feeding circuit to the other.

Figure 1:
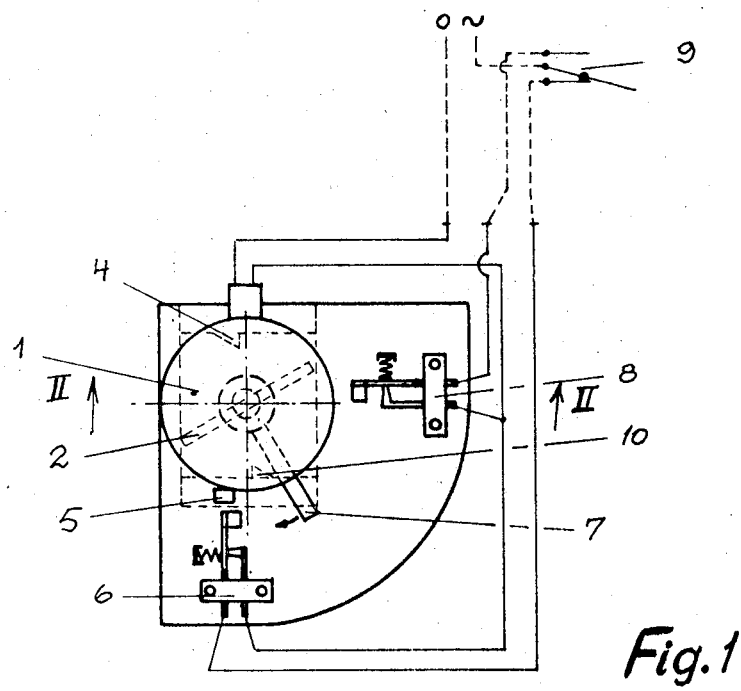
FIG. 1 shows a first embodiment of the motor controlled valve according to the present invention.

In FIG. 1, the valve body is shown while it moves to open position. Before the arm 7 hits the stop 5, the arm 7 will disconnect the switch 6 and will, accordingly, disconnect the current to the motor. When it is requested to close the valve, the switch 9 is switched over in such a way that the motor receives current via the other feeding circuit. Such switching over from one circuit to the other may e.g. be carried out by means of a thermostate. if the motor starts in the wrong direction of rotation, the arm 7 will be moved against the stop 5 and the motor will be blocked and will reverse its start direction and will move the valve 2 anti-clockwise in FIG. 1, until the arm 7 reaches the switch 8 before the valve body hits the projections 4 and 10. At the start of this closing movement the switch 6 will be closed by means of a spring indicated on the drawing.

Accordingly, when the closed position has been reached, the switch 6 will be in the closed position and the switch 8 will be in the off position, and the valve is ready to be opened when the switch 9 is shifted over. When this happens, the projections 4 and 10 will block the motor if it starts in the wrong direction of rotation and the motor will shift over to the right direction of rotation.

In the embodiment shown in FIGS. 3–8 the control explained above is used in connection with a raiator valve for a central heating plant.

The valve itself consists of a valve housing 3, having a partition 11 wherein a hole 12 is provided. The hole 12 is bordered by a cylindrical seat ring 13 against which a palette shaped valve body 14 is pressed by means of a spring 15. The shape of the valve body 14 appears clearly from FIGS. 6 and 8 wherein the valve body is shown in closed and open positions, respectively. From these two figures it will be seen that the valve body controls the cross section area of the flow opening by being rotated over the seat ring 13 which is made e.g. of plastic material. Accordingly, the valve seat will be self-cleaning, deposits being scraped away when the valve works. The difference of pressure between the inlet and the outlet of the valve housing is applied to the upper surface of the valve body and, accordingly, the valve body will be pressed towards tha seat ring with increasing pressure when the pressure difference rises and, accordingly, the valve body will maintain a perfect sealing. On the other hand, the degree of opening of the valve is independent of the action from the pressure difference upon the valve body.

Figure 6:
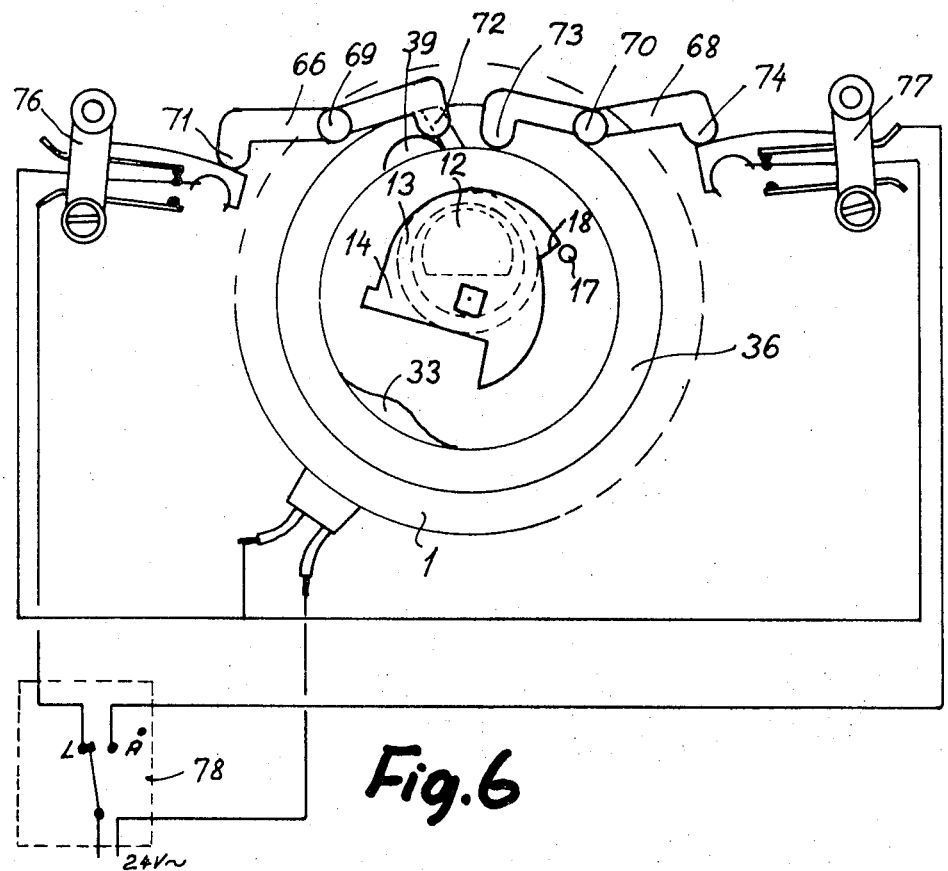
FIG. 6 shows a diagram, illustrating the motor circuit and the switches belonging thereto in the closed position of the valve.

A movement of the valve body 14 past the closed position shown in FIG. 6 is prevented by a stop pin 17 secured in the partition 11 which cooperates with a projection 18 on the valve body 14. Accordingly, the stop pin 17 acts in the same way as the projections 4 and 10 in FIG. 1. The open position of the valve body is limited by another stop arrangement which will be explained in more details in the following.

Figure 5:
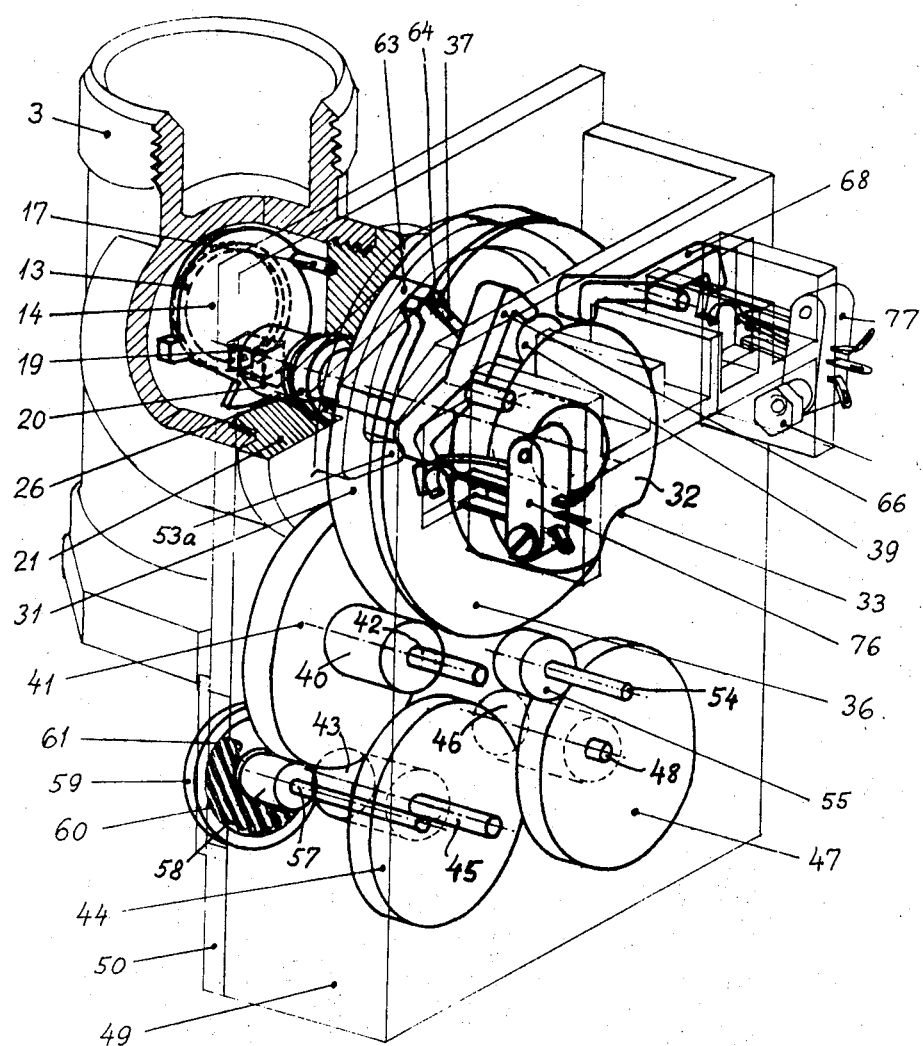
FIG. 5 shows a perspective picture of the embodiment in FiG. 3 with the valve body in closed position.
Figure 7:
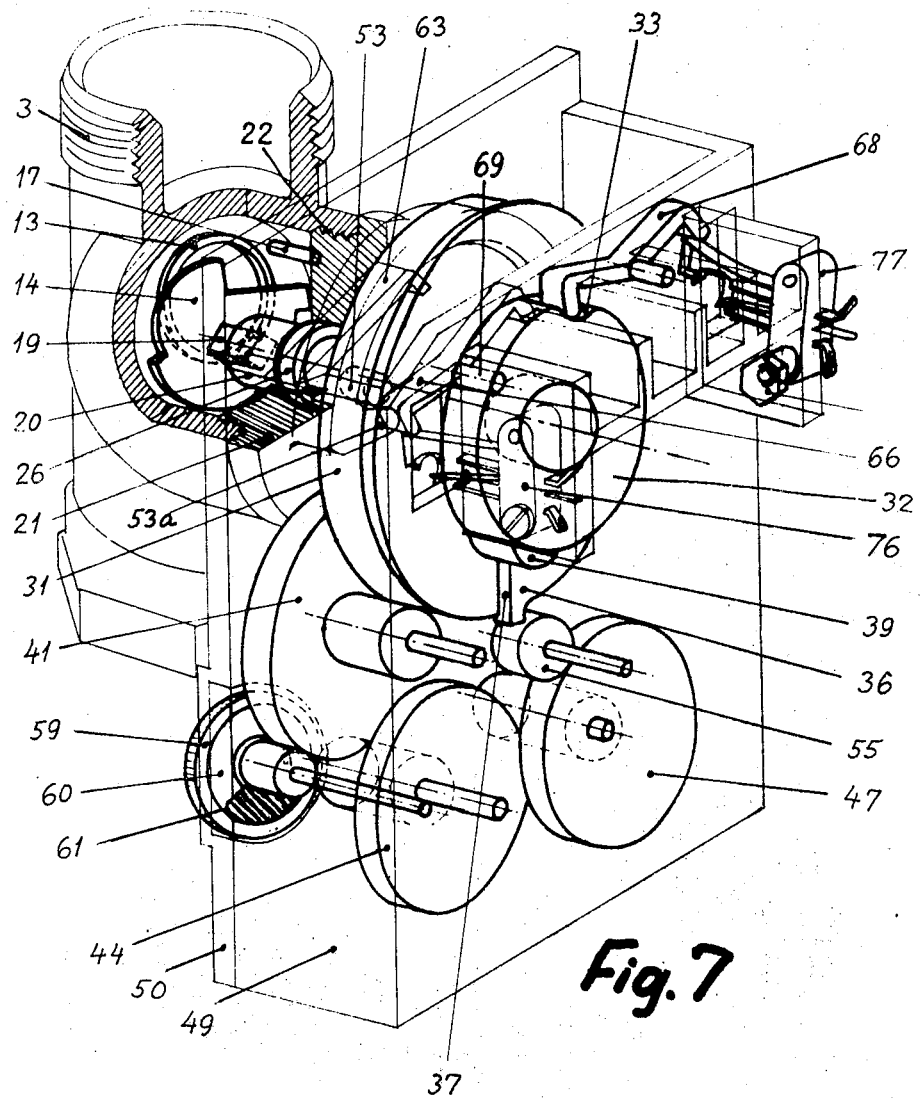
FIG. 7 shows a perspective picture corresponding to FIG. 5, but with the valve body in the open position.

The valve body 14 is journalled in the partition 11 by means of a trunnion 18 and at the opposite side of the valve body, a stud 19, having a square cross section, is secured which engages the end of a spindle 20. The spindle passes through a cover 21 which, as illustrated in FIGS. 5 and 7, is screwed into the valve housing 3 by means of threads 22. In order to seal the spindle 20 in the cover 21, a conical collar 23 is provided on the spindle and in an annular recess in the cover 21, a sealing ring 24, having a square cross section, is positioned. At the opposite side of the cover 21 a further recess is provided for a small O-ring 26, the position of which is secured by means of an outer cover 28 secured by means of screws 28 and, simultaneously, acting as bearing for the spindle.

Figure 3:
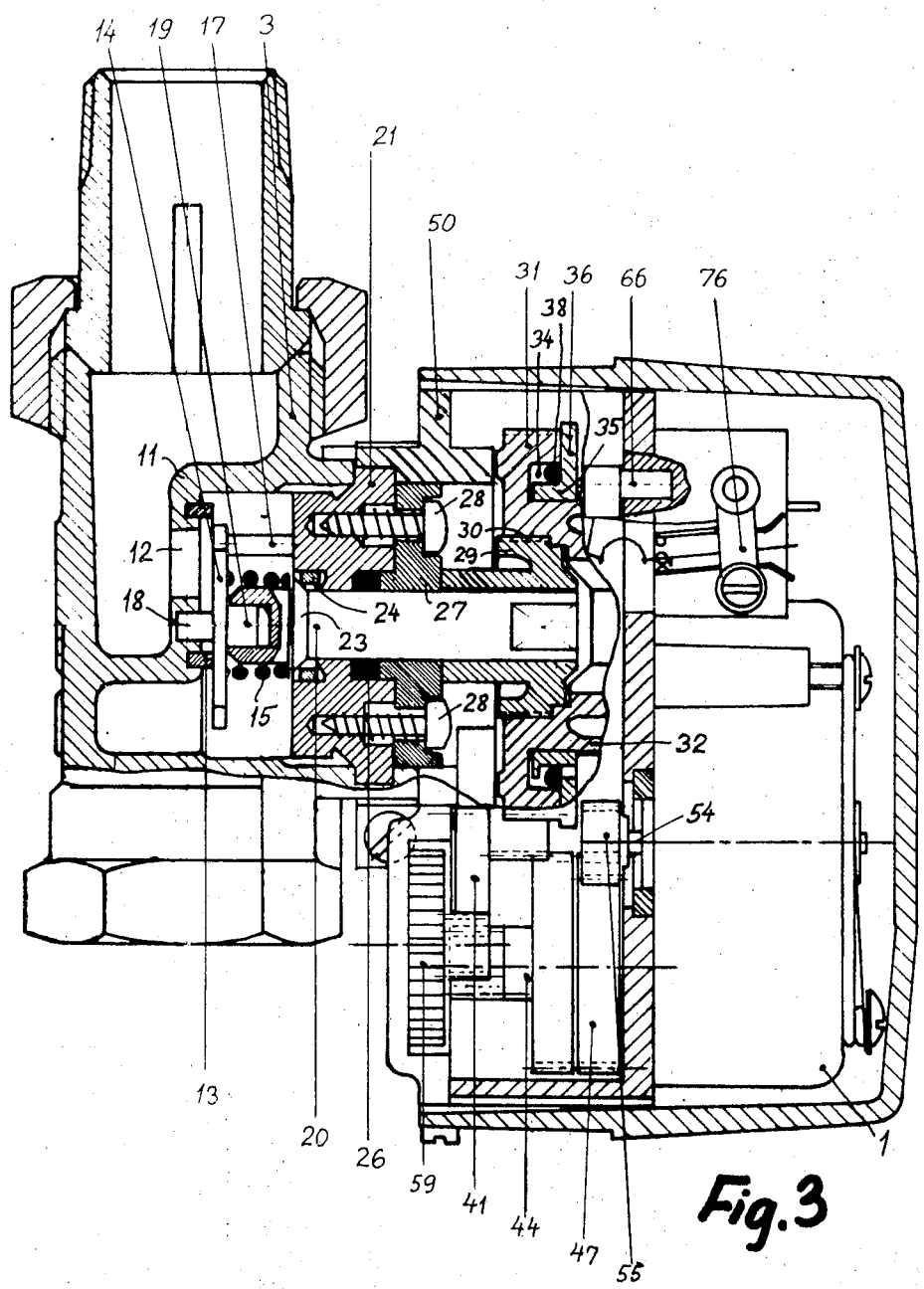
FIG. 3 shows a cross section of another embodiment of the motor controlled valve according to the invention constructed as a radiator valve.

To the end of the spindle 20 projecting from the outer cover 27, a hub 29 is secured. Axially extending fine teeth 30 are provided along the circumference of the hub 29 for engaging a gear wheel 31, having correspondingly inner axially extending fine teeth. The engaged teeth 30 are shown in FIG. 3.

Figure 4:
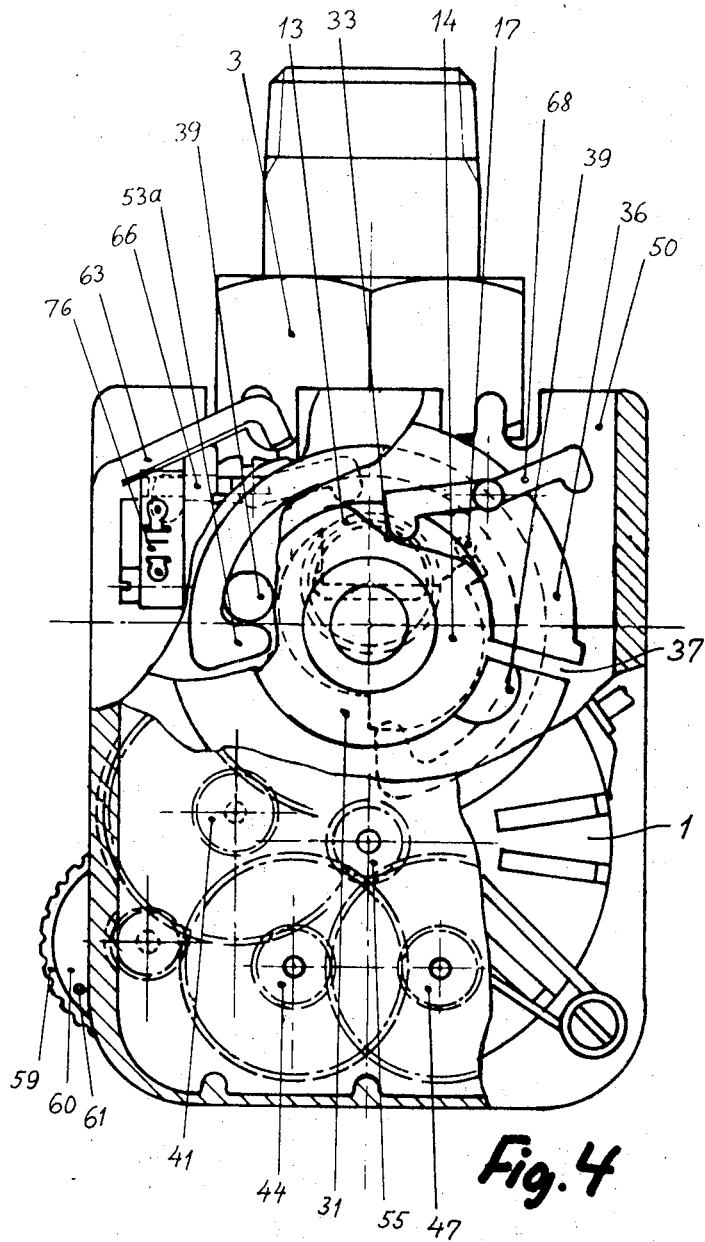
FIG. 4 shows a front view of the embodiment in FIG. 3 partly in section.

At the front surface of the gear wheel 31 an annular projection 32 having a radially extending notch 33 is arranged, FIG. 5. Around the projection 32 a recess 34 is cut out in the gear wheel 31, FIG. 3, and the recess serves to accomodate a collar 35 of a cam ring 36. A slot 37 extends through the cam ring 36, FIG. 4, and around the collar 35 an annular spring is arranged which clamps the collar 35 towards the annular projection 32. A cam 39, FIG. 4, is provided on the cam ring 36 and by rotating the cam ring 36 with respect to the gear wheel 31, the cam 37 may be moved about the projection 32 by overcoming the friction between the collar 35 and the projection 32. In this way, the angular distance between the cam 39 and the radially extending notch 33 in the projection 32 may be adjusted.

As it appears clearly from FIG. 5, the gear wheel 31 engages a small gear wheel 40 to which a greater gear wheel 41 is secured. This pair of gears 40, 41 is journalled on a shaft 42 and the gear wheel 41 engages a small gear 43 to which a greater gear wheel 44 is secured. The pair of gear wheels 43, 44 is journalled on a shaft 45. The gear wheel 44 engages a further small gear wheel 46 to which a greater gear wheel 47 is secured. The pair of gears 46, 47 is journalled on a shaft 48. These gear wheels are arranged inside a gear box 49 which is closed at the back side by means of a mounting plate 50. In the mounting plate a hole 51 is provided bordered by a collar 52 by means of which the gear box 49, 50 may be mounted upon the cover 21 of the valve housing 3. By this mounting, the hub 29 is pushed into the gear wheel 31 in such a way that the fine teeth 30 thereof engage each other.

On the back side of the gear wheel 31 a stationary abutment, 53, FIG. 7, is provided, which cooperates with an abutment 53a at the inner side of the mounting plate 50 in order to prevent a rotation of the valve body 14 past its open position. Accordingly, the abutments 53 and 53a correspond to the stop 5 and the arm 7 in the embodiment according to FIG. 1.

On the front side of the gear box 49 a motor 1 of the same kind as explained in connection with the embodiment according to FIGS. 1 and 2, is mounted in such a way that the shaft 54 with a pinion 55 secured to the shaft extends into the gear box wherein the pinion 55 engages the gear wheel 47.

Inside the gear box a gear wheel 58 engages the gear wheel 41 is journalled on a shaft 57, FIG. 5. The gear wheel 58 is secured to a small wheel 59, the circumference of which is knurled and extends partly out from the gear box through a slot so that the wheel 59 may be turned manually. An indicator disc 60 is provided along the front surface of the wheel 59 and engages frictionally therewith. One half of the indicator disc is red and the other half is blue. To the indicator disc a stop pin 61 is secured which by rotating the gear wheel 58 prevents the indicator disc from rotating more than approximately half a revolution together with the wheel 59 before the stop pin hits the outer surface of the gear box after such rotation, FIG. 4. Accordingly, if the gear wheel 58 has been rotated for opening the valve, the red part of the indicator disc will be visible from the outside, and if the gear wheel 58 has been rotated for closing the valve, the blue part of the indicator disc will be visible.

The gear box is made of plastic material and a part of the top side of the box is formed as a locking arm 63. FIG. 4. When the cam ring 36 is positioned in the gear box in such a position that the slot 37, FIG. 4, is positioned opposite a nose 64 on the locking arm 63, the cam ring may be arrested by depressing the locking arm. By rotating the wheel 59 manually, it is now possible to rotate the gear wheel 31 with respect to the arrested cam ring 36 in order to adjust the angular distance between the cam 39 and the notch 33 and, accordingly, to adjust the degree to which the valve will open as it will be explained in further details in the following.

In the gear box two rocking arms 66 and 68 are journalled upon pins 69 and 70. Each rocking arm comprises two noses 71, 72 and 73, 74, respectively, FIGS. 6 and 8. Each of the noses 71 and 74 cooperates with a switch 76 and 77, respectively, which are connected in the same way as explained with reference to the switches 6 and 8 in FIG. 1, i.e., each of the switches is provided in a feeding circuit for the motor 1, and switching over between the feeding circuits is carried out by means of a switch 78 which is controlled by means of a thermostate. The nose 72 of the rocking arm 66 cooperates with a cam 39 of the cam ring 36, and the nose 73 of the rocking arm 68 cooperates with the notch 33 in the annular projection on the gear wheel 31. During the rotation of the gear wheel 31 for opening and closing the valve body, the noses 72 and 73 slide along the cylindrical circumference of the projection 32.

Figure 8:
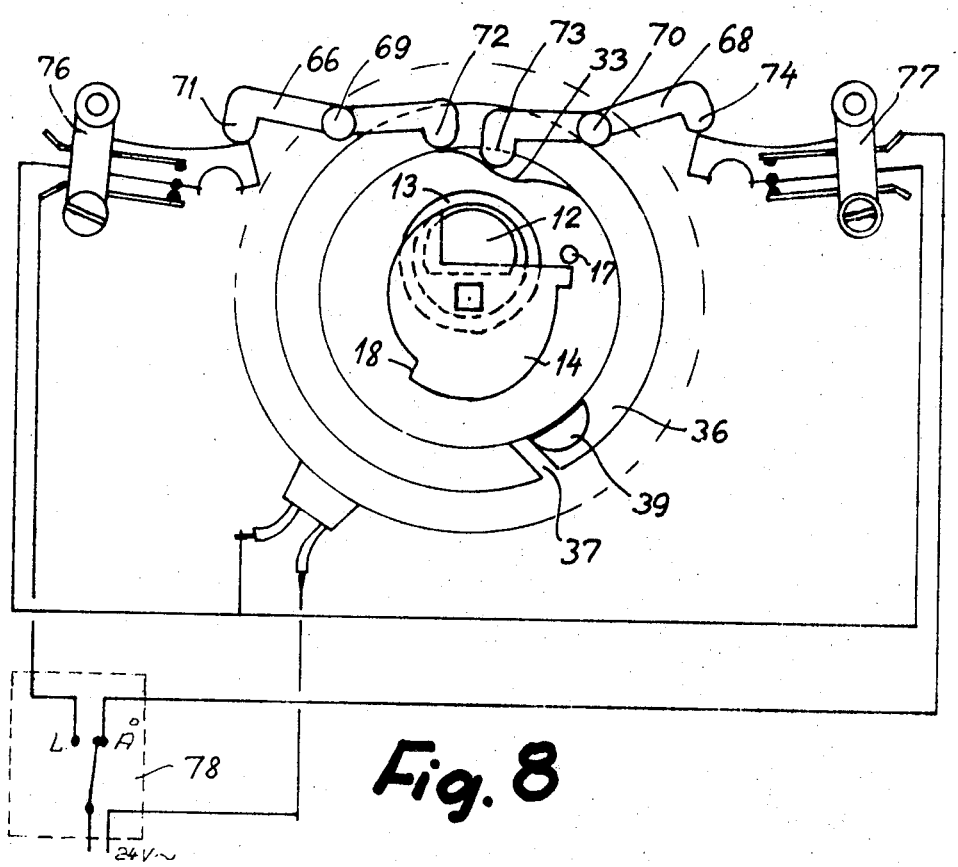
FIG. 8 shows a diagram corresponding to FiG. 6, but with the valve body in the open position.

The valve illustrated in FIGS. 3–8 operates in the following way:

In order to open the valve from the closed position shown in FIG. 6, the switch 78 is shifted for closing the feeding circuit of the motor via the closed switch 77. If the motor starts in the wrong direction of rotation, viz. tries to rotate the valve body 14 clockwise in FIG. 6, the abutment 18 on the valve body 14 will hit the stop pin 17 and block the motor, and the motor will reverse its starting direction so as to move the valve body anticlockwise in FIG. 6, until the rocking arm 68 breaks the switch 77 by engaging the notch 33. The switch 77 will be opened immediately before the abutment 53, at the lower surface of the gear wheel 31, FIG. 7, hits the abutment 53a on the mounting plate 50. At the start of the opening movement, the cam 39 will be removed from the corresponding switch 76 which accordingly closes. The parts will now be in the position shown in FIG. 8, provided the valve has been preadjusted to open fully.

In order to close the valve, the switch 78 is switched over in such a way that the motor 1 now receives current via the closed switch 76. If the motor starts the gear wheel 31 in the wrong direction of rotation, the abutment 53 of the gear wheel 31 will hit the abutment 53a on the mounting plate 50 and block the motor so as to shift its directions of rotation for rotating the valve body 14 clockwise in FIG. 8 until the cam 39 rocks the rocking arm 66 which, accordingly, will break the switch 76. The switch 76 will be broken immediately before the abutment 18 on the valve body 14 hits the stop pin 17. At the beginning of this movement, the rocking arm 78 will be moved for closing the switch 72 so that the motor may now be fed via the switch 72 by shifting-over the switch 78.

On the drawing, the cam 39 is shown in such a position with respect to the gear wheel 31 and, accordingly, with respect to the notch 33 that the valve body 14 is moved for fully opening of the seat 13. The movability of the cam 39 with respect to the gear wheel 31, combined with the fine teeth 30, FIG. 3, which couple the valve spindle 20 and the gear wheel 31 via the hub 29, allows a pre-adjustment of the degree of opening of the valve body 14 as previously indicated.

Such pre-adjustment is carried out in the following way:

The gear box is always mounted upon the valve cover 21 with the valve body 14 in the closed position and with the slot 37 in the cam ring 36 arranged opposite the nose 64 on the locking arm 63, FIG. 5. Due to the fact that the teeth 30 are very fine, the spindle 20 and the gear wheel 31 will always be engageable with the valve body and the cam ring in the positions explained above. In order to change the preadjustment, the valve is closed manually by means of the wheel 59, unless it happens to be closed already, and now the slot 37 will be opposite the nose 64 of the locking arm as explained above. Then the gear box is removed by loosening the collar 62 and by withdrawing the hub 29 from engagement with the gear wheel 31. By depressing the locking arm 63, the cam ring 36 will now be arrested by engagement between the nose 64 and the slot 37. By rotating the gear wheel 31 manually by means of the wheel 59 via the gear wheels 58, 41 and 40, the adjustment of the switch 76 with respect to the cam 39 will be maintained, but the gear wheel 31 and, accordingly, also the notch 33 will be rotated. If it is requested to limit the opening movement of the valve body, the wheel 59 is rotated in direction for reducing the angular distance between the cam 39 and the notch 33. During such rotation the angle which after the remounting of the gear box will exist between the abutment 53 at the back side of the gear wheel 31 and the abutment 54a on the inner side of the mounting plate 50 of the gear box, cf. FIG. 7, will be reduced corresponding to the reduction of the angle between the cam 39 and the notch 33. Accordingly, after the remounting of the gear box, the gear wheel 31 can only be rotated to a correspondingly less angle in the opening direction before the abutment 53 hits the abutment 53a and, accordingly, prevents an opening of the valve body 14 past the opening degree now adjusted. If it is requested to increase the opening degree, the wheel 59 is rotated on the opposite direction.

I claim:

1. In a motor operated valve of the type that includes a valve housing having a valve seat; a valve body mounted in the housing for movement between an open position and a shut position with respect to the valve seat; a motor mounted on the housing; means for coupling the motor to the valve member for moving the member between the open and the shut positions; first mechanical stop means positioned with respect to the housing for preventing movement of the valve body in one direction past the open position; second mechanical stop means positioned with respect to the housing for preventing movement of the valve body in the opposite direction past the shut position; a first single throw limit switch having one terminal connected to the motor and positioned with respect to the housing for disconnecting current to the motor when the valve body reaches the open position; a second single throw limit switch having one terminal connected to the motor and positioned with respect to the housing for disconnecting current to the motor when the valve body reaches the shut position; and a double throw control switch having a movable contact connectable to a source of electric power, a first fixed contact connected to the other terminal of the first limit switch and a second fixed contact connected to the other terminal of the second limit switch, the improvement wherein:

the motor consists of one single-phase, alternating current, synchronous motor having arbitrary directions of rotation that are reversible if rotation in either direction is blocked;

the one terminal of the first switch and the one terminal of the second switch are connected to the same motor lead; and the first and second limit switches are positioned for disconnecting current to the motor before the valve body reaches the open and shut positions, respectively, so that the motor will stop before further movement of the valve body is blocked by the respective stop means.

2. The motor operated valve of claim 1, further comprising spring means for respectively biasing the first and second limit switches to the closed position.

3. The motor operated valve of claim 2 further comprising an arm rigidly connected to the valve body for opening the first and second limit switches against the biasing force of the spring means to disconnect the current to the motor before the valve body reaches the open and shut positions, respectively, and for cooperating with at least one of the mechanical stop means for preventing movement of the valve body past the corresponding open or shut position.

4. A motor driven control valve for a radiator comprising:

a valve housing having a valve seat;

a valve body mounted in the housing for movement between an open position and a shut position with respect to the valve seat;

a single-phase, alternating current, synchronous motor, having arbitrary directions of rotation that are reversible if rotation in either direction is blocked;

a gear train engageable with the valve body at a plurality of angular positions relative thereto for coupling the motor to the valve body to move the valve body between the open and shut positions in response to rotation of the motor;

an abutment on a gear of the gear train;

a first stop means connected to the housing for engaging the abutment on the gear to prevent movement of the valve body in one direction past the open position;

an abutment on the valve body;

a second stop means mounted in the housing for engaging the abutment on the valve body to prevent movement of the body in the other direction past the shut position;

first and second single throw limit switches attached to the housing and having one terminal connected to the motor;

a double throw control switch having a movable contact connected to a source of alternating current and first and second fixed contacts connected to the other terminals of the first and second limit switches respectively;

first and second actuating members coupled to the valve body for engaging the first and second limit switches to disconnect current to the motor before the valve body reaches the open and shut positions, respectively, the position of the first actuating member relative to the second actuating member being adjustable for changing the amount of movement of the valve body between the first and second limit switch disconnect positions.

5. The motor operated valve of claim 4 wherein the first and second actuating members are supported by a gear of the gear train.

6. The motor operated valve of claim 5 wherein one of the actuating members comprises a slotted cam ring frictionally mounted on the gear of the gear train, the ring having a cam for actuating the respective limit switch at a preselected angular position of the gear, and the valve further comprises a locking arm attached to the housing for selective engagement with the slot of the cam ring to hold the cam ring from rotation with the gear ring for adjusting the relative angular position between the actuating members.

7. The motor operated valve of claim 4 further comprising:

a gear box enclosing the gear train;

a wheel rotatably mounted in the gear box so that a segment of the wheel projects from the box, the wheel being coupled to the gear train so that it rotates by an angle at least as great as the angle subtended by the segment when the valve body is moved between its open and shut positions;

an indicator disc mounted concentrically and in frictional contact with the wheel; and a stop pin mounted on the indicator disc for contacting the side of the gear box at each limit of valve travel, the indicator disc having one marking on one side of the stop pin and a different marking on the other side of the stop pin such that one marking is visible from the outside of the gear box when the valve is shut, and the other marking is visible when the valve is open.

8. The motor operated valve of claim 4 wherein the valve body comprises a flat plate, one side of which contacts the valve seat, the plate being mounted for rotation in its own plane to cover the opening of the valve seat in the shut position and to at least partially uncover the opening in the open position.

* * * * *